United States Patent [19]

Endo et al.

[11] Patent Number: 5,100,719

[45] Date of Patent: Mar. 31, 1992

[54] BIAXIALLY ORIENTED POLYESTER FILM CONTAINING MULTILAYERED CROSS-LINKED PARTICLES

[75] Inventors: Kazuo Endo; Megumi Komiyama, both of Yokohama, Japan

[73] Assignee: Diafoil Company, Limited, Tokyo, Japan

[21] Appl. No.: 624,110

[22] Filed: Dec. 7, 1990

[30] Foreign Application Priority Data

Dec. 14, 1989 [JP] Japan .................................. 1-324750

[51] Int. Cl.⁵ ......................... B32B 7/02; B32B 27/18
[52] U.S. Cl. .................................. 428/213; 428/327; 428/407; 428/480; 428/910
[58] Field of Search ............... 428/213, 327, 407, 480, 428/910

[56] References Cited

U.S. PATENT DOCUMENTS 4,568,616  2/1986  Seifried et al. ...................... 428/480
4,746,703  5/1988  Dallmann et al. ................... 525/176
5,032,458  7/1991  Dallmann et al. ............... 428/423.7

Primary Examiner—Merrell C. Cashion, Jr.
Assistant Examiner—D. S. Nakarani
Attorney, Agent, or Firm—David G. Conlin; Robert F. O'Connell

[57] ABSTRACT

A biaxially oriented polyester film containing 0.01 to 4 wt % of multilayered high-molecular particles having a weight-average particle size of 0.05 to 3 μm which comprise core crosslinked high-molecular particles having a glass transition temperature of not lower than 100° C. coated with a crosslinked polymer having a glass transition temperature of lower than 100° C., the ratio Dw/Dn of the weight-average particle size (Dw) and the number-average particle size (Dn) being not more than 1.3 is disclosed. The film of the present invention has excellent running property and wear resistance and is useful as a base film for various products such as magnetic recording media, capacitors, photomechanical plates, electric insulators, heat-sensitive transfer film, packaging film, transfer marks and gold and silver threads. Thus, the present invention has a high industrial value.

8 Claims, 1 Drawing Sheet

BIAXIALLY ORIENTED POLYESTER FILM CONTAINING MULTILAYERED CROSS-LINKED PARTICLES

BACKGROUND OF THE INVENTION

The present invention related to a biaxially oriented film having a uniform surface and excellent slipperiness and wear resistance.

Polyester films, which have excellent physical and chemical properties, are widely used as an industrial material. Above all, biaxially oriented polyethylene terephthalate films are used for base films of magnetic recording media and dielectrics of capacitors due to their excellent mechanical strength, dimensional stability and flatness. By utilizing the excellent transparency, they are also widely used in the fields of graphic arts, display, package materials, etc.

In the practical use of these films, they are required to have a god running property and a high wear resistance, but these properties cannot be said satisfactory in conventional polyester films.

For example, when a film is brought into contact with another film or a part such as a metal pin at a high speed, wear is increased, whereby a scratch or abrasion dust is produced on the film. In magnetic recording, for example, the abrasion dust causes a missing in a recording signal, namely, dropout, thereby greatly deteriorating the commercial value of the film.

It is generally known that if the surface of the film is made coarse to a certain extent, running property and the wear resistance are improved. For this purpose, a method of adding fine particles to a material polyester is adopted and partially put to practical use, but the quality of the thus-produced polyester is still insufficient in simultaneous improvement of running property and the wear resistance.

For example, so-called precipitated particles produced from a residual catalyst at the time of producing a polyester are easily broken during the stretching process, and a film obtained by using such particles is inferior in running property and wear resistance, and in addition, is difficult to reuse. On the other hand, when inert inorganic or organic particles are added to and mixed with a polyester, the particles often slip off the surface of the film in the form of a white powdery material.

SUMMARY OF THE INVENTION

As a result of the researches undertaken by the present inventors so as to solve the above-described problems and to provide an excellent film which simultaneously satisfies the running property and wear resistance and also sufficiently meets other requirements for films, it has been found that a film containing multilayered high-molecular particles produced by coating the surface of specific crosslinked high-molecular particles with a specific crosslinked polymer satisfies all the properties required above. the present invention has been achieved on the basis of this finding.

The present invention provides a biaxially oriented polyester film containing 0.01 to 4 wt % of multilayered high-molecular particles having a weight-average particle size of 0.05 to 3 μm which comprise crosslinked high-molecular particles having a glass transition temperature of not lower than 100° C. coated with a crosslinked polymer having a glass transition temperature of lower than 100° C., the ratio Dw/Dn of the weight-average particle size (Dw) and the number-average particle size (Dn) of the multilayered high-molecular particles being not more than 1.3.

DETAILED DESCRIPTION OF THE INVENTION

Figure 1:
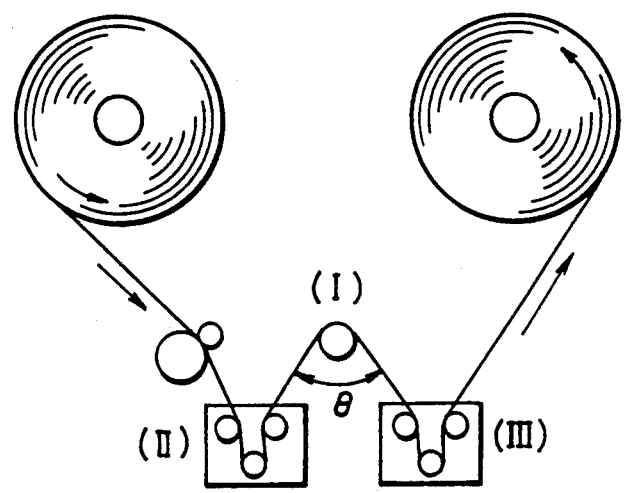
FIG. 1 shows a running system for evaluating the coefficient of dynamic friction with a metal, wherein the reference numeral (I) represents a fixed pin of 6 mm diameter plate with hard chromium 6 mm in diameter, (II) an inlet tension meter and (III) an outlet tension meter, and θ is 135°.

"Polyester" referred to in the present invention means a polyester obtained from an aromatic dicarboxylic acid such as a terephthalic acid, 2,6-naphthalenedicarboxylic acid and an ester thereof and ethylene glycol as the main starting materials, but it may be produced by using another comonomer as the third component. As the carboxylic acid for the co-monomer, at least one selected from the group consisting of isophthalic acid, phthalic acid, adipic acid, sebacic acid and an hydroxycarboxylic acid such as p-hydroxyethoxybenzoic acid is usable. As the glycol for co-monomer, at least one selected from the group consisting of diethylene glycol, propylene glycol, butanediol, 1,4-cyclohexanedimethanol and neopentyl glycol is usable. In any case, the polyester in the present invention means a polyester in which not less than 80% of the constitutional repeating units are ethylene terephthalate units or ethylene 2,6-naphthalate units. The polyester used in the present invention is preferred to have an intrinsic viscosity of 0.55 to 0.70.

The characteristic feature of the present invention lies in that the sharp protuberances are formed on a film by stretching by using multilayered crosslinked high-molecular particles which have an good affinity for a polyester.

The inorganic or organic particles which are ordinarily uses as an additive to a polyester produce sharp protuberances on the surface of a film without deformation when a strong stress is applied during the stretching process. A film containing these particles is therefore excellent in running property. However, although such organic particles have a comparatively good affinity for a polyester, produce pores around the particles when the film is stretched, so that when the surface of the film is worn, the particles easily slip off the film.

The present inventors have found that when particles obtained by coating the surfaces of crosslinked high-molecular particles, which are unlikely to be deformed by a strong stress applied at the time of stretching, with a flexible crosslinked polymer are used, it is possible to obtain a film having a good running property and a high wear resistance.

As an example of the crosslinked high-molecular particles which constitute the core of the multilayered crosslinked high-molecular particles, a fine powder of a polymer having crosslinked structure will be cited. More precisely, a copolymer of a monovinyl compound (A) having only one aliphatic unsaturated bond in the molecule and a compound (B) having at least two aliphatic unsaturated bonds in the molecule as a crosslinking agent. The copolymer may have a group which can react with a polyester.

As the compound (A), methacrylic acids and methyl or glycidyl esters thereof, maleic anhydride and alkyl derivatives thereof such as alkyl esters, vinyl glycidyl ethers, styrenes, alkyl-substituted styrenes are usable.

As the compound (B), divinylbenzene, divinylsulfone, ethylene glycol dimethacrylate, etc. are usable. At least one compound (A) and at least one compound (B), respectively, are used for obtaining the copolymer, and ethylene or a compound having a nitrogen atom in the molecule may be copolymerized therewith.

In the present invention, it is especially necessary to select the component of these compounds so that particles which are unlikely to be deformed by a strong stress applied at the time of stretching are obtained. For this reason, the copolymer components, especially, the compound (A) is selected so that the glass transition temperature of the crosslinked polymer is high, in other words, to be not lower than 100° C., preferably not lower than 110° C., more preferably not lower than 120° C. The upper limit of the glass transition temperature is preferred to be 130° C.

To this end, a compound which can produce a polymer having a glass transition temperature of not lower than 100° C. when polymerized singly is preferably used. As examples of such compounds, alkyl esters of methacrylic acid and styrene derivatives represented by styrene are mentioned, however, the compound is not restricted thereto.

The degree of crosslinking also influences the deformation of the particles. In the present invention, a high degree of crosslinking is preferable so long as there is no problem in he manufacture of particles.

The weight ratio of the compound (B) in the copolymerizing components is not less than 1%, preferably not less than 5%, more preferably not less than 10%. The upper limit of the weight ratio is preferably 30%.

In the present invention, the surface of the crosslinked high-molecular particles which constitute the core is coated with a crosslinked polymer having a glass transition temperature of lower than 100° C. An example of the crosslinked polymer is a copolymer of a monovinyl compound (C) having only one aliphatic unsaturated bond in the molecule and a compound (D) having at least two aliphatic unsaturated bonds in the molecule as a crosslinking agent. Such a copolymer may have a group which can react with a polyester.

As the compound (C), acrylic acid esters, methacrylic acid esters and derivatives thereof, maleic anhydride and alkyl derivatives thereof such as alkyl esters, vinyl glycidyl ethers, vinyl acetate, styrene, alkyl-substituted styrenes are usable.

As the compound (D), divinylbenzene, divinylsulfone, ethylene glycol dimethacrylate, etc. are usable. At least one compound (A) and at least one compound (B) may be used for producing the copolymer, and ethylene or a compound having a nitrogen atom in the molecule may be copolymerized therewith.

In the present invention, it is especially necessary to select the composition of these compounds so that the copolymer may have a required flexibility. For this reason, the copolymer components, especially, the compound (C) is selected so that the glass transition temperature of the crosslinked polymer is low, in other words, to be lower than 100° C., preferably not higher than 90° C., more preferably not higher than 80° C. The lower limit of the glass transition temperature is preferably 50° C.

In order to obtain a crosslinked polymer having a glass transition temperature of lower than 100° C., it is preferred to use as the comonomer a compound which can produce a polymer having a glass transition temperature of lower than 0° C. when polymerized singly. More precisely, $C_2$–$C_4$ alkyl esters of acrylic acid, $C_6$–$C_{12}$ alkyl esters of methacrylic acid and styrene derivatives having an $C_6$–$C_{12}$ alkyl group at the para-position may be mentioned, however, the compound is not restricted thereto.

The degree of crosslinking also influences the deformation property. In the present invention, a comparatively low degree of crosslinking is preferable for the crosslinked polymer for coating so long as the heat resistance thereof is not so low.

The weight ratio of the compound (D) in the copolymerizing components is 0.5 to 20%, preferably 0.7 to 15%, more preferably 1 to 10%. The degree of heat resistance is depending upon the type of monomers, but it is preferred that the reduction in weight after 2-hour heating in a nitrogen gas at 300° C. is not more than 20 wt %, more preferably not more than 10 wt %.

The crosslinked polymer for coating preferably contains a group which can react with a polyester such as an ester group, carboxyl group, hydroxyl group and epoxy group. However, so long as the dispersibility in the polyester is excellent, such a group need not necessarily be contained.

The coating layer may or may not be porous. The thickness of the coating layer is 1/100 to ½, preferably 1/50 to ½, more preferably 1/30 to ½ of the diameter of the core particles. If the thickness is less than 1/100, an elastic effect of the coating layer is insufficient, so that it is impossible to absorb a strong stretching stress and eliminate the problem of slipping-off of the particles as in the case of single coating with a silane coupling agent or the like. On the other hand, if the thickness exceeds ½, the elastic effect is so strong that the running property of a resultant film unfavorably becomes insufficient.

The thickness of the coating layer is easily obtained by measuring the particle diameters before and after coating by an electron microscope.

In the present invention, the weight-average particle size of the multilayered crosslinked high-molecular particles is 0.05 to 3 μm, preferably 0.1 to 2 μm. If the weight-average particle size is less than 0.05 μm, the running property and the wear resistance are insufficient. On the other hand, if it exceeds 3 μm, the surface roughness of the film unfavorably becomes too large.

In order to provide a uniform surface for the film in the present invention, it is necessary that the particle size distribution of the multilayered crosslinked high-molecular particles is sharp. To realize a sharp particle size distribution, the ratio Dw/Dn of the weight-average particle size (Dw) and the number-average particle size (Dn) is not more than 1.3, preferably not more than 1.2, more preferably not more than 1.1.

In order to forming the crosslinked polymer which is easily deformed on the surface of the core crosslinked high-molecular particles which are difficult to deform, a seed emulsion polymerization method, for example, is employed. The seed emulsion polymerization method herein referred to means a broad sense of emulsion polymerization including a so-called soap free emulsion polymerization. That is, the seed emulsion polymerization method is a method of polymerizing monomers on the surface of crosslinked high-molecular particles which are obtained by soap free emulsion polymerization or by polymerization using a slight amount of emulsifier for preventing agglomeration.

One example of a process for producing the multilayered crosslinked high-molecular particles of the present invention is as follows. After a slight amount of emulsifier and a predetermined amount of water-soluble initiator such as hydrogen peroxide and potassium persulfate are dissolved in water, a solution of a mixture of the compound (A) and the compound (B) are added thereto. Thereafter, the resultant solution is heated at a temperature of not lower than the decomposition temperature of polymerization initiator, usually 40° to 90° C., under stirring for about 3 to 10 hours to carry our the polymerization. After the completion of the polymerization, a predetermined amount of the compound (C) and compound (D) are added to polymerize them under stirring for about 3 to 10 hours in a temperature range of 40° to 90° C., thereby completing the polymerization. The multilayered crosslinked high-molecular particles are obtained in the form of a water slurry uniformly dispersed, and the water slurry is preferably converted into a ethylene glycol slurry or into the form of dried particles in order to mix the crosslinked high-molecular particles with a polyester.

Since agglomerates are apt to be produced under some conditions of bath rate and monomer composition, a dispersion stabilizer or the like may be used in polymerization. A process for producing the multilayered crosslinked high-molecular particles is not specified as far as the requirements of the present invention are satisfied.

The content of multilayered crosslinked high-molecular particles in the film of the present invention is 0.01 to 4 wt %, preferably 0.05 to 0.5 wt %. If the content is less than 0.01 wt %, the slipperiness of the film is unfavorably deteriorated, while if the content exceeds 4 wt %, the surface of the film becomes too coarse for praticle use.

A method of mixing the multilayered crosslinked high-molecular particles with a polyester which is a film-forming material is not specified and any known method may be adopted. For example, they may be added to a polyester in any stage of the production of the polyester. Preferably, they may be added to the polyester after esterification or ester interchange reaction and before the starting of polycondensation in the form of an ethylene glycol slurry, or the particles are directly blended with polyester chips.

In this way, in the present invention, it is possible to produce a film having excellent properties which cannot be obtained in the prior art by stretching a polyester containing the multilayered crosslinked high-molecular particles. It is also possible to add other particles such as the particles of kaolin, talc, calcium carbonate, titanium dioxide and aluminum oxide in an amount which does not impair the feature of the present invention.

According to the present invention, it is possible to improve the running property and the wear resistance to a higher degree or improve the mechanical strength and the slitting property of a film which is excellent in other properties. Therefore, a film which is more suitable as a base film of a magnetic tape, for example, can be obtained.

One of the preferred physical properties of a polyester film is a refractive index of not less than 1.492 in the direction of thickness. If this value is less than 1.492, the slipperiness and wear resistance of a film are insufficient even by using the particles in accordance with the present invention. The more preferable value is 1.494 to 1.505. A film having such a physical property can be obtained, for example, by stretching in the machine direction at a temperature of 105° to 115° C., which is 5° to 30° C. higher than the ordinary stretching temperature when the film is produced by successive biaxial stretching. Alternatively, such a film can be obtained by greatly relaxing in the transverse direction after the biaxial stretching and before heat treatment.

A preferred embodiment of a polyester film having the multilayered crosslinked high-molecular particles according to the present invention is a biaxially oriented film which is strongly oriented in the machine direction and has a thickness of not more than 12.0 μm.

The film of the present invention can preferably used especially as a base film of a magnetic recording medium by utilizing a high wear resistance. This characteristic is fully displayed when used as a thin film having a high strength for high-density recording medium. To state this more precisely, such a film is effective when a film is required to have an F-5 value of not less than 12.0 kg/mm$^2$, especially 14.0 kg/mm$^2$, a thickness of not more than 12.0 μm, especially not more than 10.0 μm, and a high wear resistance.

In the present invention, when the difference $\Delta n$ ($n_{TD} - n_{MD}$) between the refractive index $n_{TD}$ in the transverse direction and the refractive index $n_{MD}$ in the machine direction is not less than 0.010, the film is suitable as a base film of a magnetic recording medium which is especially excellent in the slitting property. The slitting property is a property when a tape coated with a magnetic layer is cur with a shear cutter or the like, and when the slitting property is poor, the cut end is turned up or a whisker or a powder is produced on the cut end. When such a phenomenon is produced, a white powder adheres to the tape, thereby deteriorating the electromagnetic transducing characteristic or inducing dropout. By setting $\Delta n$ at not less than 0.010, preferably not less than 0.020, more preferably not less than 0.025, it is possible to effectively improve the slitting property. Since when $\Delta n$ is too large, inconveniences are produced in heat shrinkage or the like, $\Delta n$ is preferably not more than 0.060.

The biaxially oriented film having such physical properties can be produced, for example, by stretching an amorphous unstretched polyester film obtained from a polyester containing the multilayered crosslinked highmolecular particles by 3 to 4 times in the machine direction at about 90° C. and by 3.5 to 6 times (ordinarily at a higher stretching ratio than in the machine direction) in the transverse direction at 90° to 150° C., and heat treating the stretched film at 170° to 230° C.

The present invention will be explained in more detail while referring to the following non-limitative examples.

The evaluation and measurement of the physical properties and the characteristics of a polyester film and a magnetic tape were made in the following manner. "Part" in the following examples means "part by weight".

(1) Average particle size and particle size distribution

The particle size was measured by an electron microscope. The weight-average particle size (Dw) was calculated as the diameter corresponding to 50% weight fraction of the equivalent sphere value.

The number-average particle size (Dn) was also obtained and the ratio (Dw/Dn) of both average particle sizes was regarded as the parameter of the particle size distribution.

(2) Weight reduction

The weight reduction was obtained by heating the film in the stream of nitrogen gas (200 ml/min) from room temperature to 300° C. at a rate of 10° C./min and holding it for 30 minutes at 100° C. by using a thermal analysis machine DT-20Bs produced by Shimazu Seisakusho Ltd.

(3) Running property

The running property was evaluated by the slipperiness of the film. The film was brought into contact with a fixed metal roll plated with hard chromium at a contact angle ($\theta$) of 135°. While a load of 53 g ($T_2$) was applied to one end of the film it was caused to running at the rate of 1 m/sec, and the resistance $T_1$ (g) of the other end was measured. The dynamic coefficient of friction ($\mu d$) was obtained from the following formula:

$$\mu d = \frac{1}{\theta} \ln \frac{T_1}{T_2} = 0.424 \ln \frac{T_1}{53}$$

(4) Wear resistance

Figure 2:
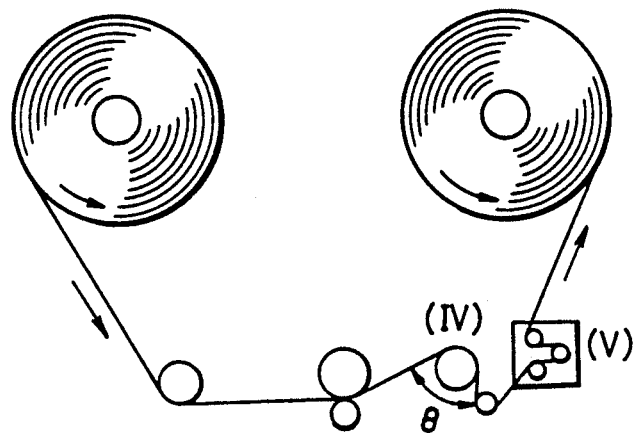
FIG. 2 shows a running system for evaluating wear resistance, wherein (IV) represents a fixed pin of 6 mm diameter plated with hard chromium, and (V) a tension meter, and θ is 135°.

The film was caused to running over a length of 1000 m by a running system shown in FIG. 2, and the amount of abrasion dust which had adhered to a fixed pin of 6 mm diameter plated with hard chromium plating was visually evaluated on the basis of the following criteria. The running speed of the film was 13 m/min, the tension was about 200 g, and 0 was 135°.
Rank A: No adhesion
Rank B: Slight adhesion
Rank C: Small amount of adhesion (larger amount than in Rank B)
Rank D: A large amount of adhesion (5) Evaluation of electromagnetic transducing characteristic A magnetic tape was first produced.

In a ball mill, were mixed and dispersed for 48 hours 200 parts of magnetic fine powder, 30 parts of polyurethane resin, 10 parts of nitrocellulose, 10 parts of a vinyl chloride-cellulose acetate copolymer, 5 parts of lecithin, 100 parts of cyclohexanone, 100 parts of methylisobutyl ketone and 30 parts of methyl ethyl ketone. Thereafter, 5 parts of a polyisocianate compound was added thereto to produce a magnetic coating. After the magnetic coating was applied to a polyester film, the film was magnetically oriented before the coating was sufficiently dried and solidified. Thereafter, the film was dried, thereby forming a magnetic layer of 2 μm thick. After the thus-coated film was subjected to surface treatment by a supercalender, it was slit to a width of ½ inch to obtain a video tape. The magnetic film obtained was then caused to running over a length of 200 m at a rate of 4 m/min with the base film surface in contact with a fixed metal pin plated with hard chromium (diameter: 6 mm, surface roughness: 3S) at a contact angle of 135° and a tension of 50 g.

The electromagnetic characteristics of the wound tape was measured by using a video deck Model NV-3700 produced by Matsushita Electric Industrial Co., Ltd.

S/N (output of VTR head)

The output of the VTR head at a measuring frequency of 4 MHz was measured by a synchroscope and the relative value was expressed by dB on the assumption that the blank was 0 dB.

Number of dropouts

A video tape which has recorded with signals of 4.4 MHz was reproduced and the number of dropouts was counted for about 20 minutes by a dropout counter produced by Okura Industrial Co., Ltd. and the number was converted into a number of dropouts per minute.

(6) Glass transition temperature

The temperature of the film was raised at a rate of 16° C./min by using a differential scanning calorimeter (DSC-Thermal Analyst Model 200, produced by Du Pont) and the point of the DSC curve at which the calorie began to change was regarded as the glass transition temperature.

EXAMPLE 1

Production of multilayered crosslinked high-molecular particles

Crosslinked high-molecular particles which constitute the core particles were first produced. After adding 0.3 part of potassium persulfate as a water-soluble polymerization initiator and 0.004 part of Emal O (sodium lauryl sulfate, produced by Kao Atlas Co. Ltd.) to 120 parts of desalted water, a uniform mixed solution of 8.5 parts of styrene and 1.5 parts of divinylbenzene were added thereto.

The temperature of the resultant mixed solution was raised to 70° C. under stirring in a nitrogen atmosphere to carry out polymerization for 6 hours. The reaction ratio was 99%, the weight-average particle size of the crosslinked high-molecular particles obtained was 0.50 μm, Dw/Dn was 1.05 and the glass transition temperature was 122° C.

Thereafter, a uniform mixed solution of 200 parts of desalted water, 1.2 parts of n-butyl acrylate, 2.6 parts of ethylene glycol monomethacrylate and 0.2 part of divinylbenzene was added to the above particles to carry out polymerization for 5 hours at a constant temperature of 70° C. under stirring in a nitrogen gas atmosphere. The reaction ratio was 99%, the weight-average particle size of the newly obtained multilayered crosslinked high-molecular particles was 0.56 μm and Dw/Dn was 1.05. Two glass transition temperatures were observed at 75° C. and 121° C. From the fact that no other particles were substantially observed in the system, that the particles size of the starting particles was increased and that two glass transition temperature were observed, it is clear that the particles as the starting material were uniformly coated. The weight reduction of the obtained multilayered crosslinked high-molecular particles by heating was 5.3%.

To the water slurry of the multilayered particles produced, was added 190 parts of ethylene glycol and the water was distilled off by heating under a reduced pressure.

Production of polyester film

Into a reactor, were charged 100 parts of dimethyl terephthalate, 60 parts of ethylene glycol and 0.09 part of magnesium acetate tetrahydrate and heated to carry out ester interchange reaction, while raising the temperature and distilling off methanol. The reaction temperature was gradually raised to 230° C. in 4 hours after the start of the reaction to substantially complete the ester interchange reaction.

Thereafter, 4 parts of ethylene glycol slurry of the multilayered crosslinked high-molecular particles having a weight-average particle size of 0.56 μm was added and, further, 0.04 part of ethyl acid phosphate and 0.035 part of antimony trioxide were added to the reaction mixture to carry out polycondensation for 4 hours, thereby obtaining a polyethylene terephthalate having an intrinsic viscosity of 0.66.

The polyester obtained was dried for 6 hours at 180° C. in a nitrogen atmosphere and then extruded by an extruder to form a sheet of 220 μm thick. The sheet was stretched by 3.7 times in the machine direction and 4.0 times in the transverse direction and thereafter heat set at 220° C. for 5 seconds to obtain a biaxially oriented polyester film of 15 μm thick.

Production of magnetic tape

A magnetic coating layer was applied to the film obtained to produce a magnetic tape and the characteristics thereof were measured.

EXAMPLE 2

Multilayered crosslinked high-molecular particles were produced in the same way as in Example 1 except for changing the composition of a crosslinked polymer for coating into 30 parts of ethyl acrylate, 65 parts of ethylene glycol monomethacrylate and 5 parts of divinylbenzene. The weight-average particle size of the particle obtained was 0.54 μm, Dw/Dn was 1.05 and the glass transition temperatures were 79° C. and 121° C. A film was produced in the same way as in Example 1 except for changing the mixing amount of the multilayered high-molecular particles with the polyester into 0.4 wt %, and the properties of the film were evaluated.

and the glass transition temperatures were 75° C. and 115° C. A film was produced in the same way as in Example 1 except for mixing the multilayered crosslinked high-molecular particles to the polyester so that the content of the particles in the polyester was 0.3 wt %, and the properties of the film were evaluated.

Comparative Example 1

A film was produced in the same way as in Example 1 except for changing the multilayered crosslinked high-molecular particles used in Example 1 into monolayered crosslinked high-molecular particles having a composition of 85 parts of styrene and 15 parts of divinylbenzene, as shown in Table 1, a weight-average particle size of 0.50 μm and Dw/Dn of 1.06. the properties of the film were evaluated. The glass transition temperature of the particles was 121° C.

Comparative Example 2

A film was produced in the same way as in Example 1 except for changing the multilayered crosslinked high-molecular particles used in Example 1 into crosslinked polymer particles having a composition of 30 parts of n-butyl acrylate, 65 parts of ethylene glycol monomethacrylate, and 5 parts of divinylbenzene, as shown in Table 1, a weight-average particle size of 0.32 μm and Dw/Dn of 1.06. The properties of the film were evaluated. The glass transition temperature of the particles was 73° C.

Comparative Example 3

A film was produced in the same way as n Example 1 except for using kaolin particles having a weight-average particle size of 0.55 μm and Dw/Dn of 1.25 as the particles added to the polyester. The properties of the film were evaluated.

The results of the above Examples and Comparative Examples are collectively shown in Table 1.

TABLE 1

| | Multilayered crosslinked high-molecular particles | | | | | | Film properties | | Magnetic tape characteristics | |
|---|---|---|---|---|---|---|---|---|---|---|
| | Core particle | | Coating layer | | Size of multi-layered particles | Mixing amount with film (wt %) | Running property | wear resistance | | |
| | Composition* | Particle size (μm) | Composition* | Thickness (μm) | | | | | S/N | Dropout |
| Example 1 | ST/DVB 85/15 | 0.50 | nBA/EGMM/DVB 30/65/5 | 0.03 | 0.56 | 0.30 | 0.24 | A | +2.5 | 0.6 |
| 2 | ST/DVB 85/15 | 0.50 | EA/EGMM/DVB 30/65/5 | 0.02 | 0.54 | 0.40 | 0.21 | A | +2.1 | 0.8 |
| 3 | MMA/ST/DVB 10/80/10 | 0.32 | nBA/EGMM/DVB 30/65/5 | 0.03 | 0.38 | 0.30 | 0.28 | A | +2.8 | 0.5 |
| Comparative Example 1 | ST/DVB 85/15 | 0.50 | — | — | — | 0.30 | 0.28 | C | −0.3 | 2.5 |
| 2 | nBA/EGMM/DVB 30/65/5 | 0.32 | — | — | — | 0.30 | 0.40 | A | +0.2 | 0.7 |
| 3 | Kaolin | 0.55 | — | — | — | 0.30 | 0.36 | D | −1.5 | 7.5 |

*ST: Styrene
DVB: Divinylbenzene
MMA: Methyl methacrylate
EGMM: Ethylene glycol monomethacrylate
nBA: n-butyl acrylate
EA: Ethyl acrylate

EXAMPLE 3

Multilayered crosslinked high-molecular particles were produced in the same way as in Example 1 except for changing the composition of the particles which constitute the core into 10 parts of methyl methacrylate, 80 parts of styrene and 10 parts of divinylbenzene, as shown in Table 1. The weight-average particle size of the particle obtained was 0.38 μm, Dw/Dn was 1.06

As shown in Table 1, all the films in Examples 1 to 3 according to the present invention have excellent running property and wear resistance, and they are therefore very useful as a base film of a magnetic tape, for example.

In contrast, in the case of using the monolayered crosslinked highmolecular particles having a glass transition temperature of 121° C. as in Comparative Example 1, although the running property is excellent, the wear resistance is inferior because they are not coated with a crosslinked polymer having a glass transition temperature of lower than 100° C.

In the case of using the crosslinked high-molecular particles composed of only the crosslinked polymer having a glass transition temperature of 73° C. as in Comparative Example 2, although the wear resistance is excellent, the running property is inferior.

Comparative Example 3 shows the case of using kaolin having an average particle size of 0.55 μm as an example of using inorganic particles. In this case, the film is inferior in the wear resistance. In addition, since the particle size distribution is broad and coarse protuberances are generated on the film surface, the magnetic tape characteristics are inferior.

What is claimed is:

1. A biaxially oriented polyester film containing 0.01 to 4 wt % of multilayered particles having a weight-average particle size of 0.05 to 3 μm which comprise core crosslinked particles having a glass transition temperature of not lower than 100° C. coated with a crosslinked polymer having a glass transition temperature of lower than 100° C., the ratio Dw/Dn of the weight-average particle size (Dw) and the number-average particle size (Dn) being not more than 1.3.

2. The biaxially oriented polyester film according to claim 1, wherein said core crosslinked particle comprises a copolymer of a monovinyl compound (A) having only one aliphatic unsaturated bond in the molecule and a compound (B) having at least two aliphatic unsaturated bonds in the molecule.

3. The biaxially oriented polyester film according to claim 2, wherein said monovinyl compound (A) is at least one selected from the group consisting of methacrylic acid, methyl methacrylate, glycidyl methacrylate, maleic anhydride, alkyl derivatives of maleic anhydride, vinyl glycidyl ether, styrene and alkyl-substituted styrenes.

4. The biaxially oriented polyester film according to claim 2, wherein said compound (B) is at least one selected from the group consisting of divinylbenzene, divinylsulfone and ethylene glycol dimethacrylate.

5. The biaxially oriented polyester film according to claim 1, wherein said crosslinked polymer is a copolymer of a monovinyl compound (C) having only one aliphatic unsaturated bond in the molecule and a compound (D) having at least two aliphatic unsaturated bonds in the molecule.

6. The biaxially oriented polyester film according to claim 5, wherein said monovinyl compound (C) is at least one selected from the group consisting of acrylic acid esters and derivatives thereof, methacrylic acid esters and derivatives thereof, maleic anhydride and alkyl derivatives thereof, vinyl glycidyl ether, vinyl acetate, styrene and alkyl-substituted styrenes.

7. The biaxially oriented polyester film according to claim 5, wherein said compound (D) is at least one selected from the group consisting of divinylbenzene, divinylsulfone and ethylene glycol dimethacrylate.

8. The biaxially oriented polyester film according to claim 1, wherein the thickness of the coating layer is 1/100 to ½ of the diameter of the core crosslinked particle.

* * * * *